US011874591B2

(12) United States Patent
Nakamura (10) Patent No.: US 11,874,591 B2
(45) Date of Patent: Jan. 16, 2024

(54) LIGHT SOURCE APPARATUS, PROJECTION APPARATUS AND COLOR WHEEL DEVICE

(71) Applicant: CASIO COMPUTER CO., LTD., Tokyo (JP)

(72) Inventor: Hideki Nakamura, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 17/674,445

(22) Filed: Feb. 17, 2022

(65) Prior Publication Data
US 2022/0308430 A1    Sep. 29, 2022

(30) Foreign Application Priority Data

Mar. 23, 2021 (JP) ................................. 2021-049184
Aug. 25, 2021 (JP) ................................. 2021-137385

(51) Int. Cl.
*G03B 21/20* (2006.01)
*F21K 9/64* (2016.01)
(Continued)

(52) U.S. Cl.
CPC .............. *G03B 21/204* (2013.01); *F21K 9/64* (2016.08); *G02B 26/008* (2013.01); *G03B 21/142* (2013.01)

(58) Field of Classification Search
CPC ............ G03B 21/204; G03B 21/00–64; G02B 26/008; F21K 9/00–90
See application file for complete search history.

(56) References Cited

U.S. PATENT DOCUMENTS

| 2014/0328044 A1* | 11/2014 | Mehl ....................... F21V 14/08 |
| | | 362/19 |
| 2015/0253653 A1* | 9/2015 | Fujita ................... G03B 21/204 |
| | | 353/31 |

(Continued)

FOREIGN PATENT DOCUMENTS

| JP | 2015-011302 A | 1/2015 |
| JP | 2016-103039 A | 6/2016 |

(Continued)

OTHER PUBLICATIONS

JPO; Application No. 2021-137385; Notice of Reasons for Refusal dated Jan. 10, 2023.

*Primary Examiner* — Bao-Luan Q Le
*Assistant Examiner* — Christopher A Lamb, II
(74) *Attorney, Agent, or Firm* — Fitch, Even, Tabin & Flannery LLP (57) ABSTRACT

A light source apparatus includes an excitation light emitter configured to irradiate excitation light, a phosphor that receives the excitation light and converts the excitation light into wavelength band light different from the excitation light, and a color wheel device. A first region of regions divided in a radial direction of the color wheel device includes a first transparent part that transmits the wavelength band light. A second region, which is different from the first region of the regions divided in the radial direction of the color wheel device, includes a reflector that reflects the excitation light and changes a light path and a second transparent part that transmits the excitation light. The phosphor is arranged on a light path of the excitation light reflected by the reflector or on a light path of the excitation light transmitted by the second transparent part.

18 Claims, 8 Drawing Sheets

(51) Int. Cl.
*G03B 21/14* (2006.01)
*G02B 26/00* (2006.01)

(56) References Cited

U.S. PATENT DOCUMENTS

| | | |
|---|---|---|
| 2015/0316840 A1 | 11/2015 | Maeda et al. |
| 2016/0274446 A1 | 9/2016 | Tanaka |
| 2017/0299953 A1 | 10/2017 | Maeda et al. |
| 2019/0004409 A1 | 1/2019 | Nishikawa et al. |
| 2019/0129288 A1 | 5/2019 | Maeda et al. |
| 2019/0369472 A1 | 12/2019 | Bai et al. |
| 2019/0391471 A1* | 12/2019 | Weng .................. G02B 26/008 |
| 2020/0116993 A1 | 4/2020 | Nishikawa et al. |
| 2020/0201158 A1 | 6/2020 | Maeda et al. |

FOREIGN PATENT DOCUMENTS

| | | |
|---|---|---|
| JP | 2016-177272 A | 10/2016 |
| JP | 2018-060127 A | 4/2018 |
| JP | 2019-012263 A | 1/2019 |
| JP | 2020-064269 A | 4/2020 |
| JP | 2020-516958 A | 6/2020 |

\* cited by examiner

LIGHT SOURCE APPARATUS, PROJECTION APPARATUS AND COLOR WHEEL DEVICE

CROSS-REFERENCE TO RELATED APPLICATIONS

This application is based upon and claims the benefit of priority from prior Japanese patent application No. 2021-049184, filed on Mar. 23, 2021, and prior Japanese patent application No. 2021-137385, filed on Aug. 25, 2021, the entire contents of which are incorporated herein by reference.

TECHNICAL FIELD

The present invention relates to a light source apparatus, a projection apparatus and a color wheel device.

BACKGROUND ART

In the related art, known is a single panel-type DLP (Digital Light Processing; registered trademark) projector using a spatial light modulator such as a DMD (Digital Micromirror Device). The single plate type is a type where a color image is projected by irradiating a single spatial light modulator with light of each color of R, G, and B temporally divided using a color wheel.

JP-A-2016-103039 suggests a single plate-type light source apparatus configured to excite a phosphor by laser light emitted from a semiconductor laser element, to temporally divide light of a predetermined color component separated from fluorescence generated by the phosphor and the laser light and to irradiate a spatial light modulator with the light and the laser light.

However, in the configuration of the light source apparatus disclosed in JP-A-2016-103039, there is a problem that a number of drive units by a motor increases, and as a result, the apparatus becomes large.

SUMMARY OF INVENTION

A light source apparatus according to an embodiment of the present invention includes:
- an excitation light emitter configured to irradiate excitation light;
- a phosphor configured to receive the excitation light and to convert the excitation light into wavelength band light different from the excitation light; and
- a color wheel device,
- wherein a first region of regions divided in a radial direction of the color wheel device includes a first transparent part configured to transmit the wavelength band light,
- wherein a second region, which is different from the first region of the regions divided in the radial direction of the color wheel device, includes a reflector configured to reflect the excitation light and to change a light path and a second transparent part configured to transmit the excitation light, and
- wherein the phosphor is arranged on a light path of the excitation light reflected by the reflector or on a light path of the excitation light transmitted by the second transparent part.

A projection apparatus according to an embodiment of the present invention includes:
- an excitation light emitter configured to irradiate excitation light;
- a phosphor configured to receive the excitation light and to convert the excitation light into wavelength band light different from the excitation light;
- a color wheel device including a first transparent part configured to transmit the wavelength band light, a second transparent part configured to transmit the excitation light, and a reflector configured to reflect the excitation light and to change a light path; and
- a projection unit configured to project a projected image,
- wherein the phosphor is arranged on a light path of the excitation light reflected by the reflector or on a light path of the excitation light transmitted by the second transparent part.

A color wheel device according to an embodiment of the present invention includes:
- a plurality of filter members configured to transmit wavelength band light within a predetermined range and arranged adjacent to each other in a circumferential direction,
- wherein a first region of regions divided in a radial direction includes a first transparent part configured to transmit wavelength band light different from excitation light irradiated from an excitation light emitter,
- wherein a second region, which is different from the first region of the regions divided in the radial direction of the color wheel device, includes a reflector configured to reflect the excitation light and to change a light path and a second transparent part configured to transmit the excitation light, and
- wherein the phosphor is arranged on a light path of the excitation light reflected by the reflector or on a light path of the excitation light transmitted by the second transparent part.

DESCRIPTION OF EMBODIMENTS

First Embodiment

Hereinafter, embodiments of the present invention will be described in detail with reference to the drawings.

Figure 1:
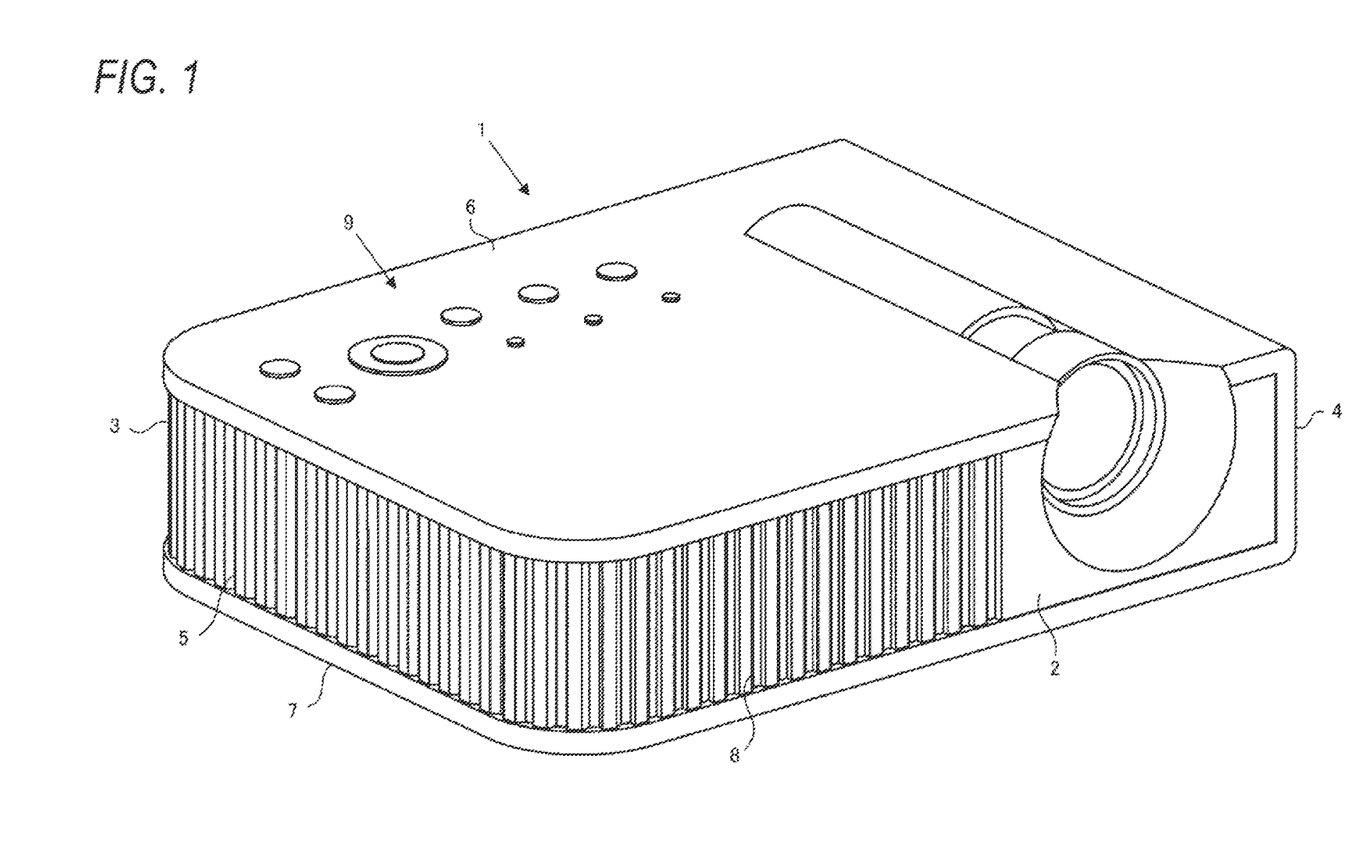
FIG. 1 is an outer perspective view showing a projection apparatus of a first embodiment.

Hereinafter, an embodiment of the present invention will be described with reference to the drawings. FIG. 1 is an outer perspective view of a projection apparatus 1. Note that, in the present embodiment, the right and left of the projection apparatus 1 indicates a right and left direction with respect to a projection direction, and the front and rear indicates a front and rear direction with respect to a screen-side direction of the projection apparatus 1.

As shown in FIG. 1, a housing of the projection apparatus 1 has a substantially cuboid shape. The housing is formed by a side surface plate consisting of a front surface plate 2, a rear surface plate 3, a left side plate 4 and a right side plate 5, an upper surface plate 6 and a lower surface plate 7. The projection apparatus 1 includes a light source apparatus and a projection unit, which will be described later. The projection apparatus 1 has the light source apparatus and the projection unit on a left side of the front surface plate 2. In addition, the front surface plate 2 is provided with a plurality of intake and exhaust holes 8. Further, although not shown, the projection apparatus 1 includes an Ir receiving unit (infrared receiving unit) configured to receive a control signal from a remote controller.

The upper surface plate 6 is provided with a key/indicator part 9. In the key/indicator unit 9, keys and indicators such as a power indicator configured to notify on and off of a power supply switch key or a power supply, a projection switch key configured to switch on and off of projection, and an overheat indicator configured to notify overheating of a light source apparatus, a display element, a control circuit or the like are arranged.

The rear surface plate 3 is provided with a variety of terminals such as a USB terminal, a D-SUB terminal for video signal input to which an analog RGB video signal is input, an S terminal, an RCA terminal, an input and output connector unit provided with an audio output terminal and the like, and a power supply adapter plug, which are not shown In addition, the rear surface plate 3 is formed with a plurality of intake and exhaust holes.

Figure 2A:
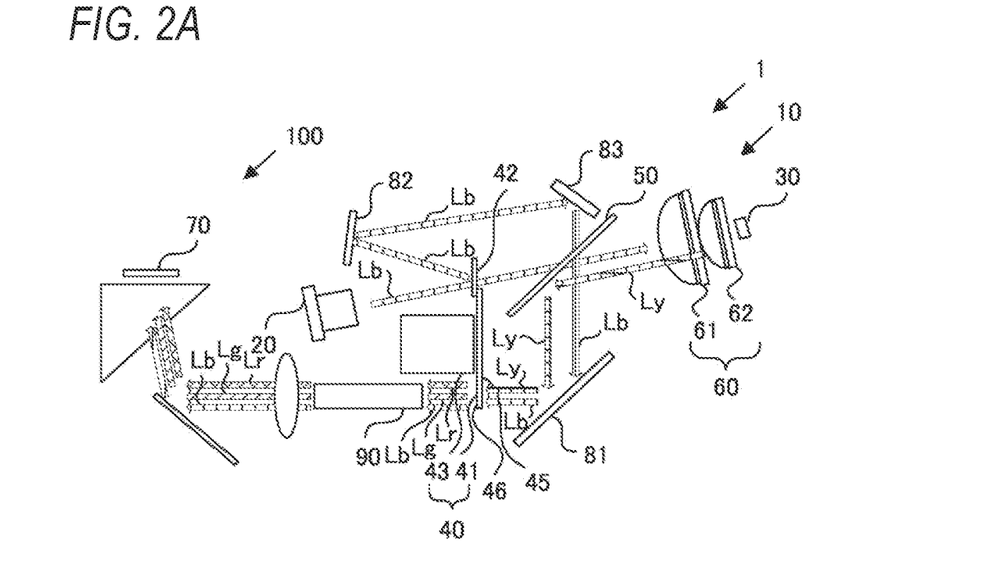
FIGS. 2A, 2B and 2C are schematic plan views showing internal structures of a light source apparatus 10 and a projection unit 100 included in a projection apparatus 1 of the first embodiment.
Figure 2B:
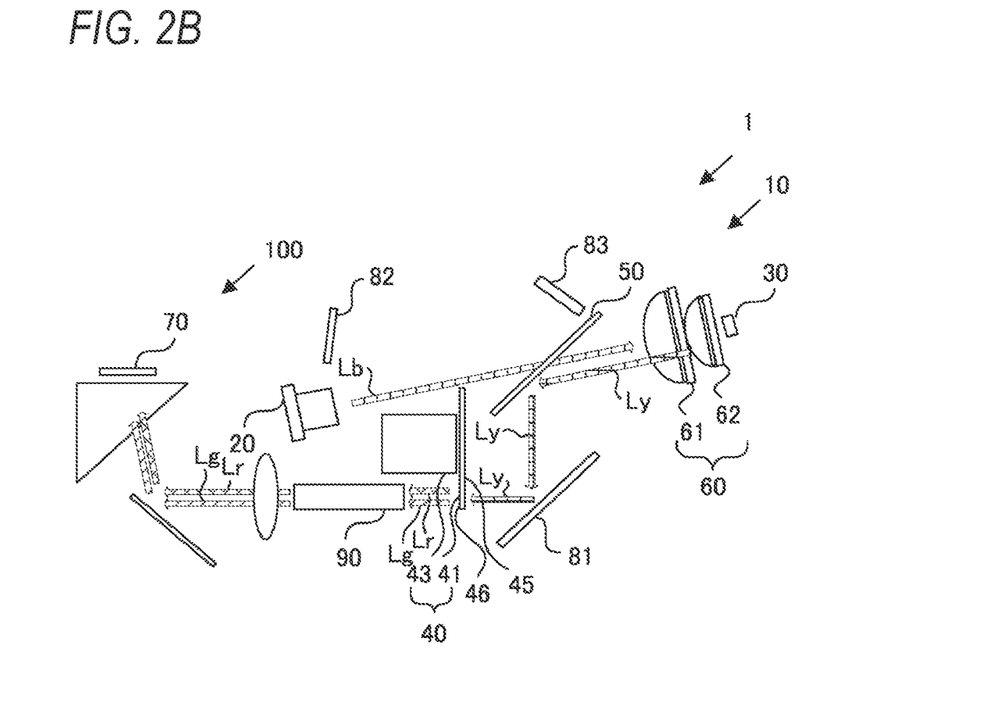
Figure 2C:
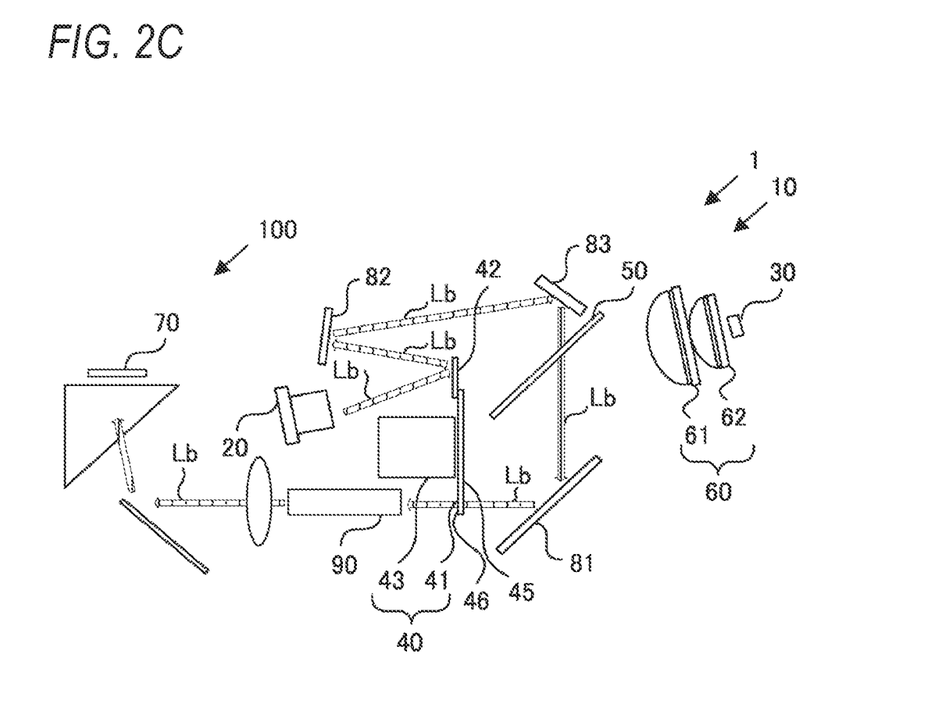

FIGS. 2A, 2B and 2C are schematic plan views showing internal structures of a light source apparatus 10 and a projection unit 100 included in the projection apparatus 1 of the first embodiment. FIG. 2A illustrates internal structures of the light source apparatus 10 and the projection unit 100. FIG. 2B is a schematic view in a case of generating wavelength band light Lr of a red component and wavelength band light Lg of a green component. FIG. 2C is a schematic view in a case of generating wavelength band light Lb (also referred to as excitation light Lb) of a blue component.

The light source apparatus 10 includes an excitation light irradiation unit 20, a phosphor 30, a color wheel device 40, a dichroic mirror 50, a first condenser lens 60, a first total reflection mirror 81, a light tunnel (LT) 90, and the like. The light source apparatus 10 may also include other configurations not shown in FIGS. 2A to 2C. The projection unit 100 includes a DMD (Digital Micromirror Device) 70. The projection unit 100 is configured to project a projected image onto a screen or the like. The projection unit 100 may also include other configurations not shown in FIGS. 2A to 2C.

The color wheel device 40, the dichroic mirror 50 and the first condenser lens 60 are arranged between the excitation light irradiation unit 20 and the phosphor 30 so that the excitation light Lb emitted from the excitation light irradiation unit (excitation light irradiation emitter) 20 is irradiated to the phosphor 30.

The excitation light irradiation unit 20 is an excitation light source of the wavelength band light Lb of the blue component. The excitation light irradiation unit 20 is described as emitting the excitation light Lb of the blue component. A laser diode can also be used for the excitation light irradiation unit 20. In addition, a light emitting diode LED can be used instead of the laser diode. In the first embodiment, the excitation light irradiation unit 20 is arranged at a position facing the phosphor 30 with the color wheel device 40 interposed therebetween.

The first condenser lens 60 includes a condenser lens 61 and a condenser lens 62. Hereinafter, when the condenser lens 61 and the condenser lens 62 are not described separately, the condenser lens 61 and the condenser lens 62 are referred to as a 'first condenser lens 60'. The first condenser lens 60 is configured to condense the excitation light Lb as a light beam bundle emitted from the excitation light irradiation unit 20 in one direction and to emit the excitation light Lb to the phosphor 30.

The phosphor 30 is arranged on a light path of the excitation light Lb emitted from the excitation light irradiation unit 20. The phosphor 30 is arranged on a light path of the excitation light Lb transmitted by a transparent part provided to the color wheel device 40. The phosphor 30 is configured to receive the excitation light Lb irradiated from the excitation light irradiation unit 20. The phosphor 30 is excited by the incident excitation light Lb, thereby generating yellow wavelength band light Ly (fluorescent light) that is light having a wavelength different from the excitation light Lb of the blue component. The first condenser lens 60 is configured to condense the yellow wavelength band light Ly generated by the phosphor 30 and to irradiate the dichroic mirror 50 with the same.

The dichroic mirror 50 has a function of transmitting the excitation light Lb of the blue component and guiding the same to the phosphor 30, and a function of reflecting the yellow wavelength band light Ly emitted from the phosphor 30 and guiding the same to the first total reflection mirror 81. The first total reflection mirror 81 is arranged obliquely with respect to an optical axis of the dichroic mirror 50.

The first total reflection mirror 81 is configured to guide the yellow wavelength band light Ly emitted from the dichroic mirror 50 to the color wheel device 40. Note that, the color wheel device 40 is arranged obliquely with respect to an optical axis emitted from the excitation light irradiation unit 20. Thereby, the excitation light Lb is caused to be incident from one surface 45-side of the color wheel device 40.

The color wheel device 40 has a plurality of filter members configured to transmit light generated by the phosphor 30 and arranged adjacent to each other in a circumferential direction. The color wheel device 40 is arranged so that an optical axis of the excitation light Lb is incident at a non-vertical angle.

The color wheel device 40 includes a color wheel 41, a reflection mirror region (reflector) 42 superimposed in an axis direction of the color wheel 41, and a motor 43 configured to rotationally drive the color wheel 41. The color wheel device 40 is arranged between the first total reflection mirror 81 and the light tunnel 90 so that an optical axis of a light beam bundle emitted from the first total reflection mirror 81 and an irradiation surface on the color wheel 41 are orthogonal to each other. Thereby, the excitation light Lb emitted from the excitation light irradiation unit 20 and the yellow wavelength band light Ly generated by the phosphor 30 are incident from the other surface 46-side opposite to one surface 45-side of the color wheel device 40.

Figure 3:
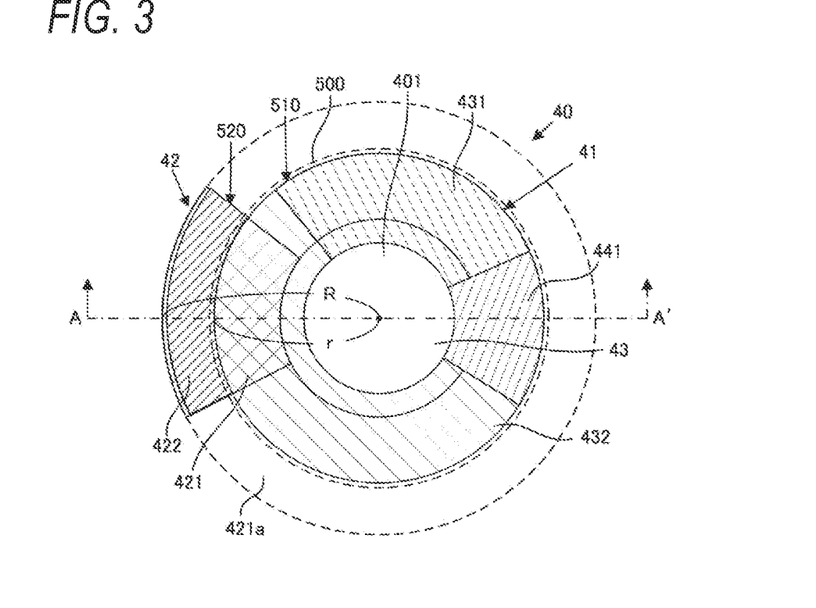
FIG. 3 is a schematic plan view of a color wheel device 40 of the first embodiment.
Figure 4:
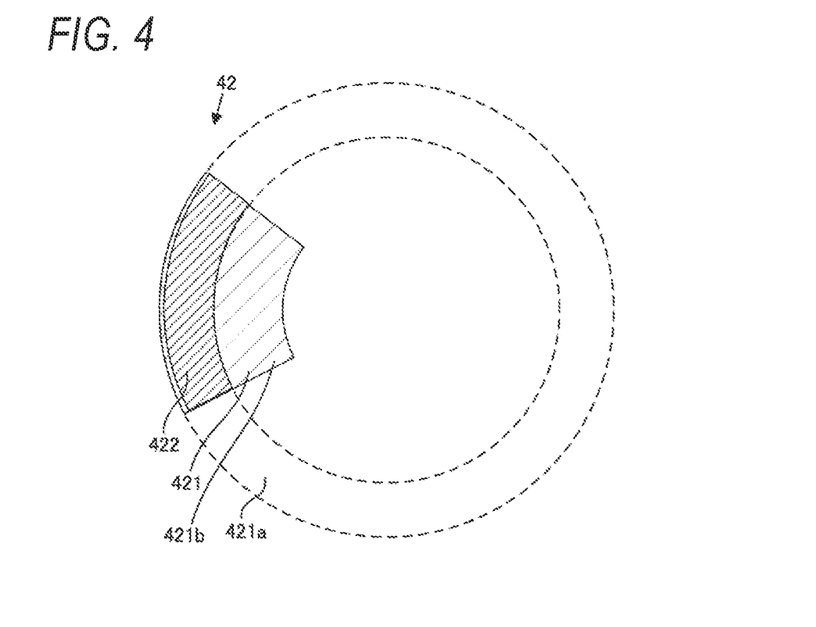
FIG. 4 is a schematic plan view of a reflection mirror region 42 of the first embodiment.

FIG. 3 is a schematic plan view of the color wheel device 40 of the first embodiment. FIG. 4 is a schematic plan view of the reflection mirror region 42 of the first embodiment.

Figure 5:
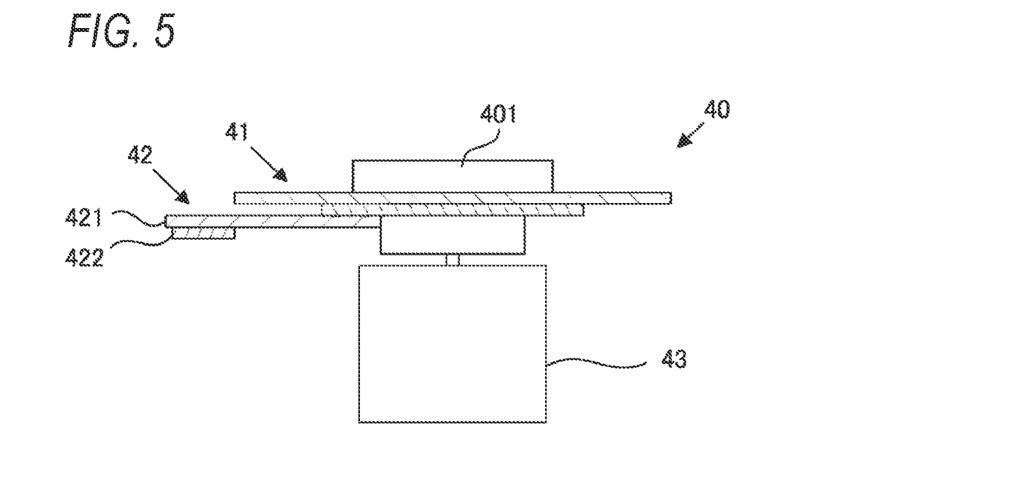
FIG. 5 is a cross-sectional view taken along a line A-A' of the color wheel device 40 of FIG. 3.

FIG. 5 is a cross-sectional view taken along a line A-A' of the color wheel device 40 of FIG. 3.

At least one region 510 (a first region) of regions divided at a radial boundary 500 of the color wheel device 40 includes filter members 431 and 432 and a transparent member 441. The filter members 431 and 432 and the transparent member 441 function as a first transparent part configured to transmit the yellow wavelength band light Ly, which is a wavelength band light different from the excitation light of the blue component. The filter members 431 and 432 function as a transparent area configured to transmit light irradiated from a light source. The other region 520 (a second region), which is different from the region 510 of the regions divided at the radial boundary 500 of the color wheel device 40, includes a mirror part 422 that functions as a reflector configured to reflect the excitation light irradiated from the light source and to change a light path, and a second transparent part 421a configured to transmit the excitation light. In the present embodiment, as shown in FIG. 3, the second transparent part 421a also includes a region without a physical constitutional member (constitutional element), in the region 510 of the color wheel device 40, i.e., on a radially outer side of the color wheel device 40. The excitation light irradiation unit 20 is arranged at such an angle that the excitation light is irradiated to the region 520. The region 510 is arranged in at least a part on a radially inner side of the color wheel device 40, and the region 520 is arranged in at least a part on the radially outer side of the color wheel device 40. A maximum radius R of the region 520 of the color wheel device 40 is formed to have a dimension larger than a radius r of the region 510 of the color wheel device 40. The second transparent part 421a is configured by a region of a difference between the maximum radius R of the region 520 of the color wheel device 40 and the radius r of the region 510 of the color wheel device 40. Therefore, as shown in FIG. 3, the second transparent part 421a is configured as a part of the color wheel device 40 even in a region where there is no physical constitutional member such as the mirror part 422, in a region from the radius r of the region 510 of the color wheel device 40 to the maximum radius R of the region 520. Note that, the region 510 may also be arranged on the radially outer side of the color wheel device 40, and the region 520 may also be arranged on the radially inner side of the color wheel device 40.

The color wheel 41 is formed in a disk shape and has a mounting hole portion 401 at a center thereof. Since the mounting hole portion 401 is fixed to a shaft part of the motor 43, the color wheel 41 can rotate around the shaft part by drive of the motor 43.

As shown in FIG. 3, the color wheel 41 has the plurality of filter members 431 and 432 and the transparent member 441 in the region 510 that is at least a part in the radial direction. The plurality of filter members 431 and 432 are configured to transmit the yellow wavelength band light Ly (fluorescent light) irradiated from the excitation light irradiation unit 20 and converted into a wavelength different from the excitation light by the phosphor 30. Specifically, the filter member 431 is configured to transmit the wavelength band light Lg of the green component from the yellow wavelength band light Ly converted by the phosphor 30, and the filter member 432 is configured to transmit the wavelength band light Lr of the red component from the yellow wavelength band light Ly converted by the phosphor 30. The filter members 431 and 432 are arranged adjacent to each other in the circumferential direction of the color wheel 41.

The transparent member 441 is configured to transmit or diffuse the excitation light of the blue component. The transparent member 441 is arranged adjacent to the filter members 431 and 432 in the circumferential direction of the color wheel.

As shown in FIGS. 3 and 4, the reflection mirror region 42 is formed and arranged in a fan shape in at least a part in the circumferential direction of the color wheel device 40. The reflection mirror region 42 is arranged superimposed on the color wheel 41 with respect to the axis direction of the color wheel device 40. As shown in FIG. 3, the reflection mirror region 42 is arranged superimposed on the filter member 432 with respect to the axis direction of the color wheel device 40. The reflection mirror region 42 may also be arranged superimposed on the filter member 431 with respect to the axis direction of the color wheel device 40.

The reflection mirror region 42 has a transparent part 421 and a mirror part 422. The transparent part 421 is formed of a fan-shaped transparent glass, and the mirror part 422 functions as a reflection layer arranged on the transparent glass of the transparent part 421. The mirror part 422 is arranged in a partial region on a radially outer side of the transparent part 421.

The transparent part 421 is arranged inside a region divided into the radial boundary 500 of the color wheel 41. The mirror part 422 is arranged outside the region divided into the radial boundary 500 of the color wheel 41. The reflection mirror region 42 is arranged at a position facing the transparent member 441 in the circumferential direction of the color wheel 41. Specifically, the mirror part 422 of the reflection mirror region 42 is arranged in a positional relationship facing the transparent member 441 in the radial direction of the color wheel 41.

Next, an example of generating the wavelength band light Lr of the red component and the wavelength band light Lg of the green component is described with reference to FIG. 2B. The excitation light Lb emitted from the excitation light irradiation unit 20 is irradiated to the reflection mirror region 42, which functions as a reflection area for reflecting the irradiated light, in the region 520 of the regions divided into the radial boundary 500.

The mirror part 422 of the reflection mirror region 42 is formed only in a partial region, and the color wheel 41 is rotationally controlled by the motor 43. For this reason, the excitation light Lb emitted from the excitation light irradiation unit 20 is reflected only when it collides with the mirror part 422, and is transmitted without being reflected during a period for which the excitation light Lb does not intersect the mirror part 422.

The transmitted excitation light Lb passes through the dichroic mirror 50 configured to transmit only the excitation light Lb of the blue component, passes through the first condenser lens 60, and is then irradiated to the phosphor 30. The phosphor 30 irradiated with the excitation light Lb from the excitation light irradiation unit 20 is excited, and the yellow wavelength band light Ly is generated, is condensed by the first condenser lens 60, and is again irradiated to the dichroic mirror 50. Since the dichroic mirror 50 is configured to transmit only the excitation light Lb of the blue component, the yellow wavelength band light Ly is reflected by the dichroic mirror 50.

The yellow wavelength band light Ly reflected by the dichroic mirror 50 is again returned to the color wheel 41 of the color wheel device 40 by the first total reflection mirror 81. In this case, the yellow wavelength band light Ly reflected by the dichroic mirror 50 is condensed on the filter members 431 and 432 that function as a transparent area of the color wheel device 40.

The color wheel device 40 is controlled in synchronization with the DMD 70 by the motor 43 and is configured so that during a green display period, the filter member 431 through which the wavelength band light Lg of the green component is transmitted passes through the optical axis and during a red display period, the filter member 432 through which the wavelength band light Lr of the red component is transmitted passes through the optical axis.

Next, an example of generating the wavelength band light Lb of the blue component is described with reference to FIG. 2C. During a period for which the color wheel 41 of the color wheel device 40 rotates and the excitation light Lb emitted from the excitation light irradiation unit 20 is irradiated to the mirror part 422, the excitation light Lb emitted from the excitation light irradiation unit 20 is reflected by the mirror part 422 of the reflection mirror region 42. The excitation light Lb reflected by the mirror part 422 is reflected by a second total reflection mirror 82 and a third total reflection mirror 83 arranged on the optical axis, and is irradiated to the dichroic mirror 50.

The dichroic mirror 50 is configured to transmit the excitation light Lb of the blue component. For this reason, the excitation light Lb of the blue component irradiated to the dichroic mirror 50 is reflected toward the first total reflection mirror 81. Since the transparent member 441 of the color wheel device 40 is arranged on the radially opposite side of the reflection mirror region 42, the excitation light Lb irradiated to the first total reflection mirror 81 is reflected by the first total reflection mirror 81 and is caused to be incident on the transparent member 441 of the color wheel 41. The excitation light Lb of the blue component incident on the transparent member 441 is caused to be incident on the DMD 70 via the light tunnel 90. For this reason, the DMD 70 can project a color image on a screen or the like by displaying the light of each color in a time-division manner according to data.

As described above, the light source apparatus 10 of the present embodiment includes the excitation light irradiation unit 20 configured to irradiate the excitation light Lb of the blue component, the phosphor 30 configured to receive the excitation light and to convert the excitation light Lb into the yellow wavelength band light Ly, and the color wheel device 40 having the plurality of filter members 431 and 432 configured to transmit selected wavelength band light of the light irradiated from the excitation light irradiation unit 20 and arranged adjacent to each other in the circumferential direction. One region 510 of the regions divided in the radial direction of the color wheel device 40 includes a first member configured by the filter members 431 and 432 configured to transmit the yellow wavelength band light Ly different from the excitation light Lb of the blue component and the transparent members 441. The other region 520, which is different from the region 510 of the regions divided in the radial direction of the color wheel device 40, includes the reflection mirror region 42 configured to reflect the excitation light Lb and to change the light path, and the second transparent part 421a configured to transmit the excitation light Lb. The phosphor 30 is arranged on the light path of the excitation light Lb transmitted by the transparent part.

That is, by arranging the reflection mirror region 42 configured to reflect the excitation light on the color wheel device 40, the color wheel device 40 is provided with the reflection region of the excitation light Lb, so that the light path of the excitation light Lb irradiated from the excitation light irradiation unit 20 is divided into paths for red component and green component generation and a path for blue component generation by time division, desired color components are created on the same color wheel 41 by the filter members 431 and 432, and the excitation light Lb of the blue component is transmitted or diffused and transmitted by the transparent member 441.

Thereby, a number of optical components required for the excitation light to reach from the excitation light irradiation unit 20 to the phosphor 30 can be minimized. Similarly, a number of components required for the excitation light Lb to reach from the phosphor 30 to the DMD 70 can be minimized. For this reason, an optical loss that is caused by passing through the optical components can be minimized. Further, the speckle can be removed by the transparent member 441 of the color wheel 41.

The transparent part 421 is arranged on the radially inner side of the color wheel device 40, and the reflection mirror region 42 and the second transparent part 421a are arranged on the radially outer side of the color wheel device 40. Thereby, the light path of the excitation light irradiated from the excitation light irradiation unit 20 is divided into paths for red component and green component generation and a path for blue component generation by time division, and desired color components can be created on the same color wheel 41 by the filter members 431 and 432.

Since the filter member 431 for red component generation and the filter member 432 for green component generation are separately arranged, optimum spectral characteristics can be respectively obtained. In addition, since the number of optical components can be minimized, the apparatus can be miniaturized while suppressing the optical loss.

Further, since the phosphor 30 is arranged on the light path of the excitation light Lb transmitted by the transparent part, the phosphor 30 and the color wheel device 40 are configured as separate bodies. For this reason, since the phosphor 30 does not need to transmit light, it does not need to be made of a transparent material such as glass. Therefore, since the phosphor can be made of a material such as metal that easily radiates heat, heat can be radiated without accumulating in the phosphor 30. Further, even when metal is adopted as a material of the phosphor 30, it is not necessary to combine a plurality of types of materials as a material constituting the reflection area of the color wheel device 40. For this reason, a structure of the color wheel device 40 can be simplified. As a result, it is possible to reduce the manufacturing cost and the failure risk.

Second Embodiment

In the light source apparatus 10 of the first embodiment, the transparent part 421 constituting the reflection mirror region 42 is formed and arranged in a fan shape in at least a part in the circumferential direction of the color wheel device 40. On the other hand, the transparent part 421 of the reflection mirror region 42 of the light source apparatus 10 of a second embodiment is formed and arranged in a circular shape over an entire region in the circumferential direction of the color wheel device 40.

Figure 6:
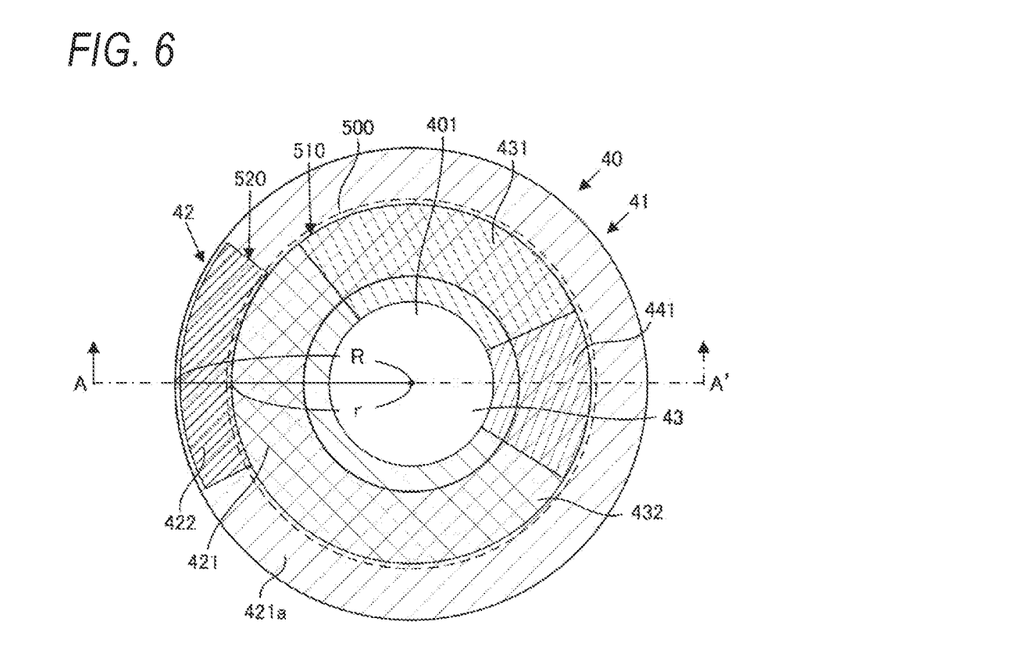
FIG. 6 is a schematic plan view of the color wheel device 40 of a second embodiment.
Figure 7:
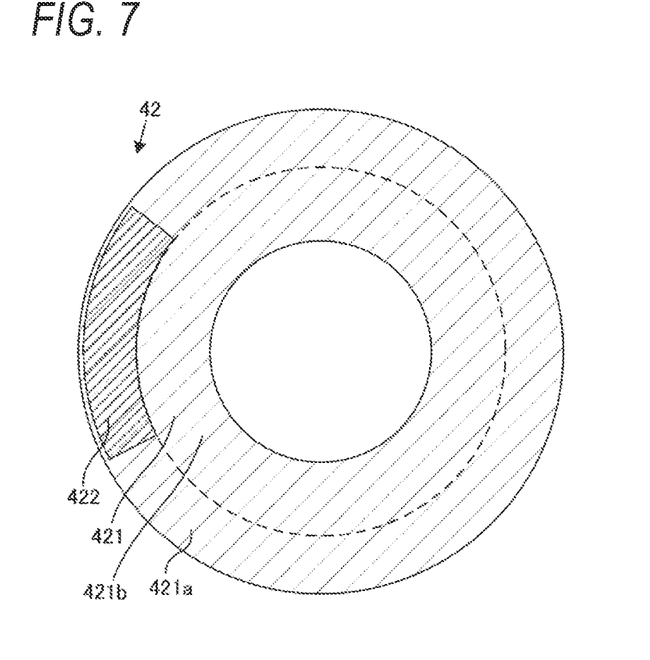
FIG. 7 is a schematic plan view of the reflection mirror region 42 of the second embodiment.
Figure 8:
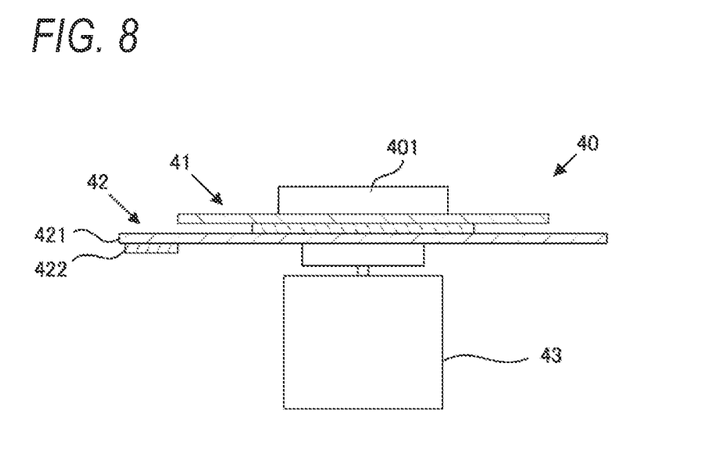
FIG. 8 is a cross-sectional view taken along a line A-A' of the color wheel device 40 of FIG. 6.

FIG. 6 is a schematic plan view of the color wheel device 40 of the second embodiment. FIG. 7 is a schematic plan view of the reflection mirror region 42 of the second embodiment. FIG. 8 is a cross-sectional view taken along a line A-A' of the color wheel device 40 of FIG. 6. In the second embodiment, as shown in FIG. 6, the second transparent part 421a is configured by a physical constitutional member over an entire circumference, in the region 510 of the color wheel device 40, i.e., on the radially outer side of the color wheel device 40. Also in the second embodiment, the maximum radius R of the region 520 of the color wheel device 40 is formed to have a dimension larger than the radius r of the region 510 of the color wheel device 40. The second transparent part 421a is configured by a region of a difference between the maximum radius R of the region 520 of the color wheel device 40 and the radius r of the region 510 of the color wheel device 40. As shown in FIG. 6, the second transparent part 421a is configured as a part of the color wheel device 40 where there is a physical constitutional member such as the transparent part 421 and the mirror part 422, in a region from the radius r of the region 510 of the color wheel device 40 to the maximum radius R of the region 520.

As shown in FIGS. 6 to 8, the transparent part 421 of the reflection mirror region 42 is arranged over the entire region in the circumferential direction of the color wheel device 40. Thereby, the color wheel 41 of the color wheel device 40 can be easily balanced when rotated, a noise that is generated due to imbalance can be reduced, and rotation control of the color wheel 41 can be stably performed.

In the above embodiments, the region 510 is arranged on the radially inner side of the color wheel device 40, and the region 520 is arranged on the radially outer side of the color wheel device 40. However, the present invention is not limited thereto. For example, the region 510 may also be arranged on the radially outer side of the color wheel device 40, and the region 520 may also be arranged on the radially inner side of the color wheel device 40. Thereby, the light path of the excitation light Lb irradiated from the excitation light irradiation unit 20 can be divided into paths for red component and green component generation and a path for blue component generation by time division, and desired color components can be created on the same color wheel 41 by the filter members 431 and 432.

Third Embodiment

Figure 9A:
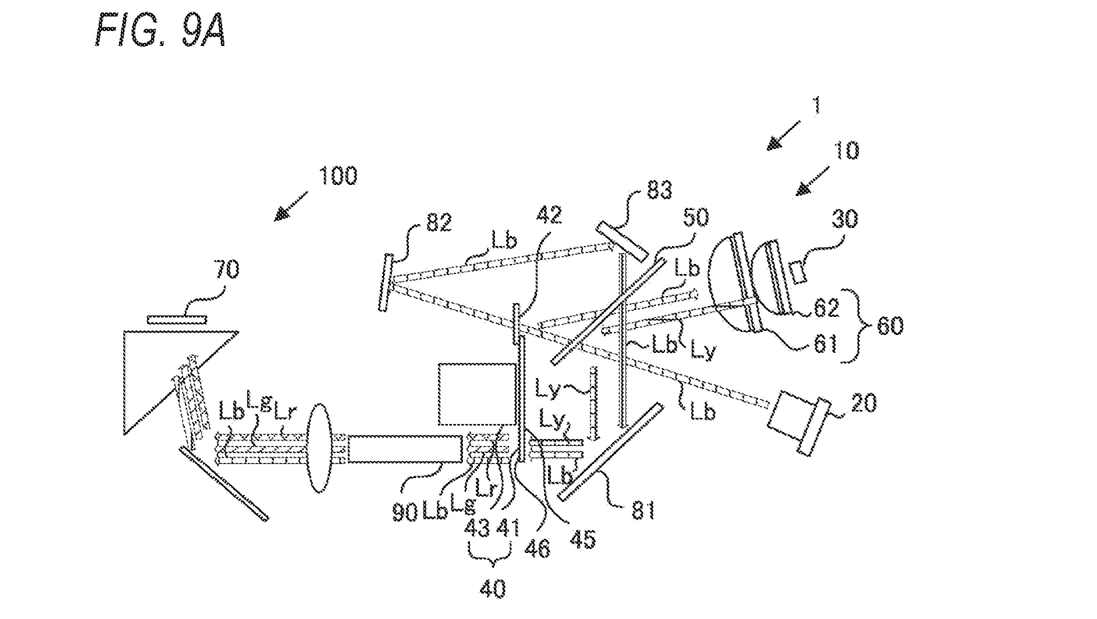
FIGS. 9A, 9B and 9C are schematic plan views showing internal structures of the light source apparatus 10 and the projection unit 100 included in the projection apparatus 1 of a third embodiment.
Figure 9B:
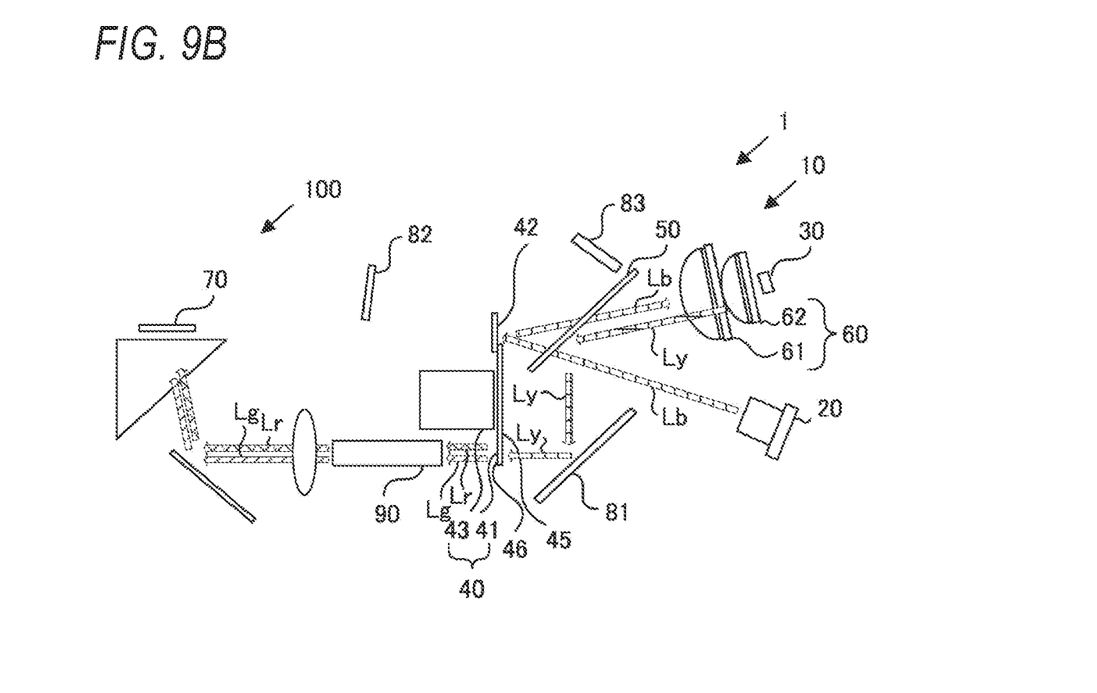
Figure 9C:
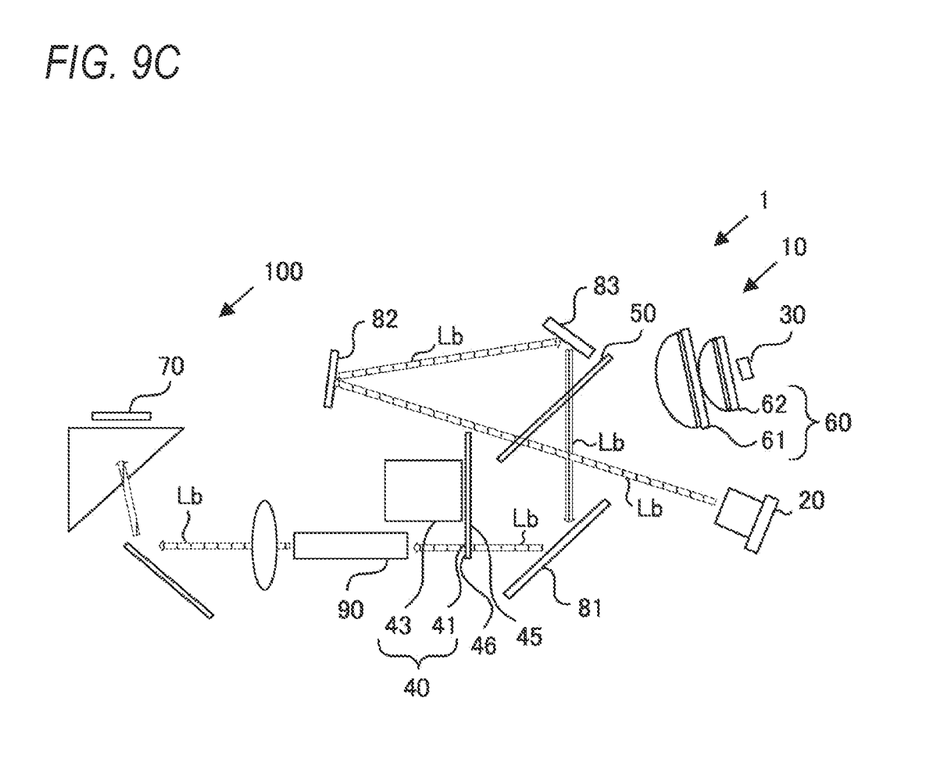

FIGS. 9A, 9B and 9C are schematic plan views showing internal structures of the light source apparatus 10 and the projection unit 100 included in the projection apparatus 1 of a third embodiment. FIG. 9A illustrates internal structures of the light source apparatus 10 and the projection unit 100. FIG. 9B is a schematic view in a case of generating wavelength band light Lr of a red component and wavelength band light Lg of a green component. FIG. 9C is a schematic view in a case of generating wavelength band light Lb (excitation light Lb) of a blue component. Note that, in the description of the projection apparatus 1 of the third embodiment, the descriptions of the same configurations as the first embodiment are omitted.

The light source apparatus 10 of the third embodiment includes an excitation light irradiation unit 20, a phosphor 30, a color wheel device 40, a dichroic mirror 50, a first condenser lens 60, a first total reflection mirror 81, a light tunnel 90, and the like. The light source apparatus 10 may also include other configurations not shown in FIGS. 9A to 9C. The projection unit 100 includes a DMD 70. The projection unit 100 is configured to project a projected image onto a screen or the like. The projection unit 100 may also include other configurations not shown in FIGS. 9A to 9C.

The color wheel device 40, the dichroic mirror 50 and the first condenser lens 60 are arranged between the excitation light irradiation unit 20 and the phosphor 30 so that the excitation light Lb emitted from the excitation light irradiation unit 20 is irradiated to the phosphor 30.

In the third embodiment, the excitation light irradiation unit 20 is arranged not on the opposite side to the phosphor 30 with the color wheel device 40 interposed therebetween but on the same side as the phosphor 30.

The first condenser lens 60 includes a condenser lens 61 and a condenser lens 62. The first condenser lens 60 is configured to condense the excitation light, which is emitted from the excitation light irradiation unit 20 and reflected by the reflection mirror region (reflector) 42 provided to the color wheel device 40, in one direction and to emit the same to the phosphor 30.

The phosphor 30 is arranged on a light path of the excitation light emitted from the excitation light irradiation unit 20. Specifically, the phosphor 30 is arranged on the light path of the excitation light reflected by the reflection mirror region (reflector 42) provided to the color wheel device 40. The phosphor 30 is configured to receive the excitation light irradiated from the excitation light irradiation unit 20. The phosphor 30 is excited by the incident excitation light Lb, thereby generating yellow wavelength band light Ly (fluorescent light) that is light having a wavelength different from the excitation light Lb. The first condenser lens 60 is configured to condense the yellow wavelength band light Ly generated by the phosphor 30 and to irradiate the dichroic mirror 50 with the same.

The first total reflection mirror 81 is configured to guide the yellow wavelength band light Ly reflected by the dichroic mirror 50 to the color wheel device 40. Note that, the color wheel device 40 is arranged obliquely with respect to an optical axis emitted from the excitation light irradiation unit 20. Thereby, the excitation light Lb is caused to be incident from one surface 45-side of the color wheel device 40.

The color wheel device 40 has a plurality of filter members configured to transmit light generated by the phosphor 30 and arranged adjacent to each other in a circumferential direction.

Next, an example of generating the wavelength band light Lr of the red component and the wavelength band light Lg of the green component is described with reference to FIG. 9B. The excitation light Lb emitted from the excitation light irradiation unit 20 is irradiated to the reflection mirror region 42, which functions as a reflection area for reflecting the irradiated light, in the region 520 of the regions divided into the radial boundary 500. Note that, the region 520 of the color wheel device 40 is arranged at a position where an angle formed with the optical axis of the excitation light Lb is not vertical.

The mirror part 422 of the reflection mirror region 42 is formed only in a partial region, and the color wheel 41 is rotationally controlled by the motor 43. For this reason, the excitation light Lb emitted from the excitation light irradiation unit 20 is reflected only when it collides with the mirror part 422. During a period for which the excitation light Lb emitted from the excitation light irradiation unit 20 is irradiated to the mirror part 422, the excitation light Lb emitted from the excitation light irradiation unit 20 is reflected by the mirror part 422 of the reflection mirror region 42.

The excitation light Lb reflected by the mirror part 422 transmits the dichroic mirror 50 configured to transmit only the excitation light Lb of the blue component, transmits the first condenser lens 60, and is then irradiated to the phosphor 30. The phosphor 30 irradiated with the excitation light Lb from the excitation light irradiation unit 20 is excited, and the yellow wavelength band light Ly is generated, is condensed by the first condenser lens 60, and is irradiated to the dichroic mirror 50. Since the dichroic mirror 50 is configured to transmit only the excitation light Lb of the blue component, the yellow wavelength band light Ly is reflected by the dichroic mirror 50.

The yellow wavelength band light Ly reflected by the dichroic mirror 50 is irradiated to the color wheel 41 of the color wheel device 40 by the first total reflection mirror 81. In this case, the yellow wavelength band light Ly reflected by the dichroic mirror 50 is condensed on the filter members 431 and 432 that function as a transparent area of the color wheel device 40.

The color wheel device 40 is controlled in synchronization with the DMD 70 by the motor 43 and is configured so that during a green display period, the filter member 431 through which the wavelength band light Lg of the green component is transmitted passes through the optical axis and during a red display period, the filter member 432 through which the wavelength band light Lr of the red component is transmitted passes through the optical axis.

Next, an example of generating the wavelength band light Lb of the blue component is described with reference to FIG. 9C. During a period for which the color wheel 41 of the color wheel device 40 rotates and the excitation light Lb emitted from the excitation light irradiation unit 20 is not incident on the mirror part 422, the excitation light Lb emitted from the excitation light irradiation unit 20 transmits without being reflected by the mirror part 422 of the reflection mirror region 42. The transmitted excitation light Lb is reflected by a second total reflection mirror 82 and a third total reflection mirror 83 arranged on the optical axis, and is irradiated to the dichroic mirror 50.

The dichroic mirror 50 is configured to transmit the excitation light Lb of the blue component. For this reason, the excitation light Lb of the blue component irradiated to the dichroic mirror 50 is reflected toward the first total reflection mirror 81. Since the transparent member 441 of the color wheel device 40 is arranged on the radially opposite side of the reflection mirror region 42, the excitation light Lb irradiated to the first total reflection mirror 81 is reflected by the first total reflection mirror 81 and is caused to be incident on the transparent member 441 of the color wheel 41. The excitation light Lb of the blue component incident on the transparent member 441 is caused to be incident on the DMD 70 via the light tunnel 90. For this reason, the DMD 70 can project a color image on a screen or the like by displaying the light of each color in a time-division manner according to data.

Further, in the above-described embodiments, the phosphor 30 is a fixed phosphor, but the present invention is not limited thereto. For example, a phosphor wheel provided with an all-around phosphor layer is also possible, or two kinds of phosphors may be applied and synchronized with the color wheel device 40.

The light source apparatus 10 of the above-described embodiments includes the excitation light irradiation unit 20, the phosphor 30, the color wheel device 40, the dichroic mirror 50, the first condenser lens 60, the first total reflection mirror 81 and the light tunnel 90, but the present invention is not limited thereto. The light source apparatus 10 may also further include a second condenser lens. The second condenser lens is arranged, for example, between the dichroic mirror 50 and the first total reflection mirror 81.

The yellow wavelength band light irradiated from the dichroic mirror 50 is guided to the first total reflection mirror 81 through the second condenser lens. That is, in this case, the second condenser lens can adjust so that a characteristic of the dichroic mirror 50 does not change, by condensing the light passing through an end portion or the like of the dichroic mirror 50. This makes it possible to suppress the optical loss.

Further, in the above-described embodiments, the excitation light of the blue component incident on the transparent member 441 is incident on the DMD 70 via the light tunnel 90, but the present invention is not limited thereto. For example, a microlens array may be arranged instead of the light tunnel 90. By arranging a microlens array having a dimension smaller than the light tunnel 90, instead of the light tunnel 90, it is possible to reduce the size of the projection apparatus 1.

In the above-described embodiments, the mirror part 422 and the color wheel 41 are separate members, but the mirror part 422 and the color wheel 41 may also be an integral member (joined to each other).

The present invention is not limited to the above-described embodiments, and can be variously modified at the implementation stage without departing from the gist of the present invention. In addition, the functions executed in the above-described embodiments may be implemented combined as appropriate as possible. In the above-described embodiments, various stages are included, and various inventions can be extracted by appropriate combinations according to a plurality of disclosed constitutional requirements. For example, even when some constitutional elements are deleted from all the constitutional elements shown in the embodiments, a configuration in which the constitutional elements are deleted can be extracted as an invention as long as the effects are obtained.

What is claimed is:

1. A light source apparatus comprising:
   an excitation light emitter configured to irradiate excitation light;
   a phosphor configured to receive the excitation light and to convert the excitation light into wavelength band light different from the excitation light; and
   a color wheel device,
   wherein a first region of regions divided in a radial direction of the color wheel device comprises a first transparent part configured to transmit the wavelength band light, the radial direction being a direction outward from a center of the color wheel device,
   wherein a second region, which is different from the first region of the regions divided in the radial direction of the color wheel device, comprises a reflector configured to reflect the excitation light and to change a light path and a second transparent part configured to transmit the excitation light, and
   wherein the phosphor is arranged on a light path of the excitation light reflected by the reflector or on a light path of the excitation light transmitted by the second transparent part.

2. The light source apparatus according to claim 1, wherein the first transparent part is arranged on a radially inner side of the color wheel device, and
   wherein the reflector and the second transparent part are arranged on a radially outer side of the color wheel device direction.

3. The light source apparatus according to claim 2, wherein the excitation light emitter is arranged at such an angle that the excitation light is irradiated to the second region.

4. The light source apparatus according to claim 1, wherein the first transparent part is arranged on a radially outer side of the color wheel device, and wherein the reflector and the second transparent part are arranged on a radially inner side of the color wheel device direction.

5. The light source apparatus according to claim 1, wherein the excitation light is incident on the color wheel device from one surface-side, and
wherein the wavelength band light is incident on the color wheel device from the other surface-side opposite to the one surface-side.

6. The light source apparatus according to claim 1, wherein the reflector is formed and arranged in a circular shape over an entire region in a circumferential direction of the color wheel device.

7. The light source apparatus according to claim 1, wherein the excitation light emitter is arranged at a position facing the phosphor with the color wheel device interposed therebetween.

8. The light source apparatus according to claim 1, wherein the excitation light emitter is arranged on a same side as the phosphor with respect to the color wheel device.

9. The light source apparatus according to claim 1, wherein the second transparent part is configured as a part of the color wheel device even in a region where there is no physical constitutional element, in a region from a radius of the first region of the color wheel device to a radius of the second region.

10. A projection apparatus comprising:
an excitation light emitter configured to irradiate excitation light;
a phosphor configured to receive the excitation light and to convert the excitation light into wavelength band light different from the excitation light;
a color wheel device comprising a first transparent part configured to transmit the wavelength band light, the first transparent part being disposed in a first region of a plurality of regions of the color wheel device that are divided from each other in a radial direction extending outward from a center of the color wheel device, and the color wheel device further comprising a second transparent part configured to transmit the excitation light, and a reflector configured to reflect the excitation light and to change a light path, the second transparent part and the reflector being disposed in a second region of the plurality of regions of the color wheel device that are divided from each other in the radial direction, the second region being different from the first region; and
a projection unit configured to project a projected image,
wherein the phosphor is arranged on a light path of the excitation light reflected by the reflector or on a light path of the excitation light transmitted by the second transparent part.

11. The projection apparatus according to claim 10, wherein the excitation light emitter is arranged at such an angle that the excitation light is irradiated to the second region.

12. The projection apparatus according to claim 10, wherein the excitation light is incident on the color wheel device from one surface-side, and
wherein the wavelength band light different from the excitation light is incident on the color wheel device from the other surface-side opposite to the one surface-side.

13. The projection apparatus according to claim 10, wherein the excitation light emitter is arranged at a position facing the phosphor with the color wheel device interposed therebetween.

14. The projection apparatus according to claim 10, wherein the excitation light emitter is arranged on a same side as the phosphor with respect to the color wheel device.

15. A color wheel device comprising:
a plurality of filter members configured to transmit wavelength band light within a predetermined range and arranged adjacent to each other in a circumferential direction,
wherein a first region of regions divided in a radial direction comprises a first transparent part configured to transmit wavelength band light different from excitation light irradiated from an excitation light emitter, the radial direction being a direction outward from a center of the color wheel device,
wherein a second region, which is different from the first region of the regions divided in the radial direction of the color wheel device, comprises a reflector configured to reflect the excitation light and to change a light path and a second transparent part configured to transmit the excitation light, and
wherein the phosphor is arranged on a light path of the excitation light reflected by the reflector or on a light path of the excitation light transmitted by the second transparent part.

16. The color wheel device according to claim 15, wherein the first transparent part is arranged on a radially inner side of the color wheel device, and
wherein the reflector and the second transparent part are arranged on a radially outer side of the color wheel device direction.

17. The color wheel device according to claim 15, wherein the first transparent part is arranged on a radially outer side of the color wheel device, and
wherein the reflector and the second transparent part are arranged on a radially inner side of the color wheel device direction.

18. The color wheel device according to claim 15, wherein the second transparent part is configured as a part of the color wheel device even in a region where there is no physical constitutional element, in a region from a radius of the first region of the color wheel device to a radius of the second region.

* * * * *